(12) United States Patent
Magro (10) Patent No.: US 11,643,849 B2
(45) Date of Patent: May 9, 2023

(54) PLANETARY GEARBOX SYSTEM

(71) Applicant: ALPINE OVERHEAD DOORS, INC., East Setauket, NY (US)

(72) Inventor: Sebastian Magro, Stony Brook, NY (US)

(73) Assignee: ALPINE OVERHEAD DOORS, INC., East Setauket, NY (US)

( * ) Notice: Subject to any disclaimer, the term of this patent is extended or adjusted under 35 U.S.C. 154(b) by 0 days.

(21) Appl. No.: 16/741,073

(22) Filed: Jan. 13, 2020

(65) Prior Publication Data

US 2021/0214973 A1    Jul. 15, 2021

(51) Int. Cl.
*E06B 9/68* (2006.01)
*E05B 65/10* (2006.01)
(Continued)

(52) U.S. Cl.
CPC ........ *E05B 65/1026* (2013.01); *E05F 15/668* (2015.01); *E06B 9/68* (2013.01);
(Continued)

(58) Field of Classification Search
CPC ..... E06B 9/68; E06B 9/11; E06B 9/17; E06B 9/18; E06B 9/74; E06B 9/70; E06B 9/82;
(Continued)

(56) References Cited

U.S. PATENT DOCUMENTS

| 1,270,964 | A | * | 7/1918 | McCloud | ................ F16H 37/00 475/7 |
| 2,883,182 | A |   | 3/1955 | Bornemann | |

(Continued)

FOREIGN PATENT DOCUMENTS

| CN | 2510896 Y | 11/2002 |
| CN | 109898949 A | 6/2019 |

(Continued)

OTHER PUBLICATIONS

PCT/US2021/013278—International Search Report and Written Opinion of the International Searching Authority, dated Mar. 11, 2021, 9 pages.
(Continued)

*Primary Examiner* — Abe Massad
(74) *Attorney, Agent, or Firm* — Nolte Lackenbach Siegel; Myron Greenspan (57) ABSTRACT

A fire door operator for a rolling door includes a housing defining an axis. An outer main gear in the form of an annular ring is mounted within the housing for rotation about the axis and formed with exterior gear teeth and radially inwardly spaced interior teeth. Planet gears are meshed with the interior teeth and a sun gear is meshed with the planet gears for rotation about the axis. A carrier is secured to the planetary gears and coupled to the shaft. A lock normally locks the main gear in relation to the housing. A drive selectively rotates the sun gear and the carrier to transmit rotational power to a rolling door shaft when secured to the carrier. A releasing device selectively releases the lock to allow free rotation of the main gear and the carrier to allow a rolling door to be lowered under its own weight.

14 Claims, 11 Drawing Sheets

(51) Int. Cl.
   *E05F 15/668*    (2015.01)
   *F16H 1/28*      (2006.01)
   *E06B 9/74*      (2006.01)
   *E06B 9/70*      (2006.01)
   *E05B 17/04*     (2006.01)

(52) U.S. Cl.
   CPC ............... *E06B 9/70* (2013.01); *E06B 9/74* (2013.01); *F16H 1/28* (2013.01); *E05B 65/104* (2013.01); *E05B 2017/043* (2013.01); *E05Y 2900/134* (2013.01); *E06B 2009/689* (2013.01)

(58) Field of Classification Search
   CPC ............... E06B 9/88; E06B 2009/689; E06B 2009/807; E05F 15/668; E05F 15/72; F16H 1/06; F16H 1/22; F16H 1/28; E05Y 2900/134

See application file for complete search history.

(56) References Cited

U.S. PATENT DOCUMENTS

| | | | |
|---|---|---|---|
| 4,392,392 A * | 7/1983 | Perisic | E06B 9/74 160/310 |
| 4,977,704 A | 12/1990 | Koenig | |
| 5,203,392 A | 4/1993 | Shea | |
| 5,482,103 A | 1/1996 | Burgess et al. | |
| 5,924,949 A | 7/1999 | Fan | |
| 6,530,863 B2 | 3/2003 | Balli et al. | |
| 6,688,447 B1 * | 2/2004 | Liu | E06B 9/68 160/133 |
| 7,261,139 B2 | 8/2007 | Varley | |
| 7,583,040 B2 * | 9/2009 | Claudel | E05F 15/70 318/264 |
| 7,731,158 B1 * | 6/2010 | Hsieh | B66D 1/20 254/358 |
| 8,069,896 B2 | 12/2011 | Magro | |
| 9,598,900 B2 * | 3/2017 | Kornish | E06B 9/74 |
| 2002/0111242 A1 * | 8/2002 | Balli | E06B 9/74 475/149 |
| 2010/0242364 A1 * | 9/2010 | Magro | E06B 9/74 49/31 |
| 2010/0258254 A1 * | 10/2010 | Lumbers | E06B 9/74 160/311 |
| 2011/0099914 A1 | 5/2011 | Herrin | |
| 2016/0245379 A1 * | 8/2016 | Daus | E06B 9/08 |
| 2017/0226799 A1 * | 8/2017 | Hebeisen | E06B 9/50 |
| 2017/0261069 A1 * | 9/2017 | Seadia | F16H 1/203 |
| 2020/0399948 A1 * | 12/2020 | Hsieh | E05F 15/72 |
| 2021/0095523 A1 * | 4/2021 | Magro | E06B 9/15 |

FOREIGN PATENT DOCUMENTS

| | | |
|---|---|---|
| EP | 0181260 A2 | 5/1985 |
| EP | 0374271 A1 | 12/1988 |
| EP | 3106598 A1 | 12/2016 |
| GB | 191400074 A | 7/1914 |
| KR | 200238715 Y1 | 9/2001 |

OTHER PUBLICATIONS

PCT/US2021/013230 International Search Report and Written Opinion of the International Searching Authority, dated Apr. 22, 2021, 6 pages.

* cited by examiner

PLANETARY GEARBOX SYSTEM

BACKGROUND OF THE INVENTION

1. Field of the Invention

The present invention generally relates to rolling doors and, more specifically, to a method and planetary gear box system apparatus for operating a rolling fire door.

2. Description of the Prior Art

Roller shutter doors have been known for some time and are used in a variety of applications. They include such categories as: rolling grille; storm doors; fire and smoke doors; air-leakage doors, counter shutters; and, the like. What they have in common is a construction that allows them to be rolled up onto a drum or tube when in the open position; or, to be unreeled from the drum when the door is being lowered. Theses doors are typically used in commercial establishments to seal or close off large doorways, or bays, and can be operated electrically, manually, or both.

The methods and systems for driving the doors into an upward or downward position, during normal or emergency operation, have evolved over time from simple pull down doors of a kind used in residential garages, to more technologically advanced electric drive systems with timers, manual over-rides, and diverse safety features.

Generally, commercial or large capacity fire doors were driven by electric motors to open or close the door. However, when a fire occurred, these mechanisms would disengage the motor from the fire door and allow the door to close under the pressure exerted by an auxiliary spring activated by mechanical means or from a counterbalance. These mechanical means included pendulums, oscillating governors, friction discs, ratchets, etc. These mechanical devices tended to be unreliable because of jamming or other malfunctions caused by the motion of the door. One early mechanism that attempted to address this problem was described in U.S. Pat. No. 5,203,392 for a Mechanism For Controlling The Raising And Lowering Of A Door, issued Apr. 20, 1993 to Shea (hereinafter referred to as "Shea").

In Shea, there is disclosed a mechanism for controlling the opening and closing of a door such as a fire door. The mechanism controls the speed of the door when it drops under the force of gravity; and, can be electrically, or manually, operated. The problem that Shea was attempting to address was the need for a fire door mechanism that regulates the raising and lowering of the door while effectively controlling the door's movement without the need of springs or similar mechanical means. The speed of the door's drop was under control of a centrifugal governor employing brake shoes.

Other prior art has addressed the need for testing the speed and effects of the door's drop during non-emergency uses. U.S. Pat. No. 5,482,103 for a Door Apparatus With Release Assembly, issued Jan. 9, 1996 to Burgess et al. (hereinafter referred to as "Burgess") teaches the use of a counterweight to offset the weight of the roller door and a reducing weight to reduce the weight of the counterweight. The assembly of the door allows the use of a standard governor to control downward speed. This use of reduced weight and the resultant reduced stress on the door allows the mechanism to use parts that are reduced in size and weight.

After the disclosures of Shea and Burgess, came the teachings of U.S. Pat. No. 5,924,949 for an Apparatus For Driving A Roller Shutter Door, issued Jul. 20, 1999 to Fan (hereinafter referred to as "Fan"). Fan teaches a driving mechanism for roller shutter doors that can be adjusted from outside of the apparatus so as to accommodate doors of different heights. The advantage of Fan is that the mechanism, if either moved from a door of one height to a door of a differing height, or if the door is not of the height for which the factory settings apply, does not have to be disassembled for adjustments. Rather, the adjustable control means is disposed within the stationary housing of the apparatus, and extends from within the apparatus to a point outside where it can be manipulated or adjusted as required. And, while Fan addresses a legitimate need, it still leaves unanswered the need to allow the door to move freely into an open position while under control of a governor.

Further improvements to the drive mechanism are taught in U.S. Pat. No. 6,530,863 for a Door Operator Unit, issued Mar. 11, 2003 to Balli et al. (hereinafter referred to as "Balli"). In Balli, an improved power transmission mechanism which works between the drive motor and the operator output shaft is disclosed. The operator unit is adapted to reverse the positions of a manual operator drive and a release mechanism. The advantage provided by Balli is the ability to interchange the operator unit components depending upon the door configuration or application. Thus, the drive mechanism can be established as either a right side or a left side mount. Balli still leaves the question of door control after rebounding, or the issue of timer adjusted openings and closings to be addressed.

The evolution of the rollup door and its drivers and safety mechanisms has continued with the disclosures of U.S. Pat. No. 7,261,139 for a Manual Operating Mechanism For Upward Acting Door, issued Aug. 28, 2007 to Varley et al. Varley teaches a mechanism that addresses the difficulty of operating a roll-up door manually in those cases where the drive motor is mounted in an assembly that is beyond the easy reach of the user. The mechanism of Varley includes a manual brake release that is foot actuated by a person using an elongated crank handle to manually move the door from an open to closed position or vice versa. A problem left unanswered by Varley is how an operator, under the stress of an emergency, can efficiently disengage the motor drive.

What is not appreciated by the prior art is the need to provide a method and apparatus for controlling the drop of the door (or curtain as the case may be) that incorporates each of the successes of the prior art while minimizing the problems. One important issue not addressed by the prior art, is that the drop of the door should be controlled by a mechanical centrifugal governor such that the door does not "bounce" after it arrives in the full open position. While in a closed position, the curtain or door must be able to maintain its locked position unless the door or curtain is manually released through the use of a manual lever and/or an electrical switch. The use of a timer to allow the door to re-open at least part-way, and then close after a specific time interval during an emergency, would provide a safety that is currently lacking in the art.

Accordingly, there is a need for an improved method and apparatus that will supply multiple safety features in the event of an emergency while providing for more efficient operation of the door during normal use.

In U.S. Pat. No. 8,069,896, assigned to the applicant of the present invention, a method and apparatus are disclosed for driving a roller shutter assembly that includes a gear box provided with a gear having external teeth along the outer periphery engageable with two one way bearings mounted on a rocker arm to selectively allow the gear to rotate in one or the other direction. This requires a rocker arm with mating opposing one way bearings. Also, included are limited switches that are directly coupled to a hub attached to the shaft of the rolling door. However, the limit switches are mounted inside the motor operator housing and require disassembly of the operator to make any changes or adjustments.

U.S. Published Patent Application No. 2016/0245379 discloses a door release mechanism that it uses an external drop aim to control a governor shaft secured to the sun gear of a planetary gear system. The release of the droparm from engagement with a rotatable plate secured to the sun gear allows the shaft to freely rotate. This, however, requires an externally mounted drop arm and an externally mounted plate that can rotate at a relatively high speed, both the drop arm and plate being exposed to contaminants and foreign objects that can interfere with their operation.

SUMMARY OF THE INVENTION

It is an object of the invention to provide a method and apparatus for operating a rolling fire door that does not have the disadvantages inherent in prior art devices of this type.

It is another object of the invention to provide a fire door operator for a rolling door that is simple and convenient to operate.

It is still another object of the invention to provide a fire door operator for a rolling door that is simple in construction and inexpensive to manufacture.

It is yet another object of the invention to provide a fire door operator for rolling doors that can be driven by a number of different drives, including hand chain assemblies, one or more motors that are mounted on the device, an external motor that drives the operator by means of a chain drive and the like.

It is a further object of the invention to provide a fire door operator for rolling doors that has a direct drive limit switch assembly mounted outside of the operator housing rendering it easily accessible for making adjustments.

It is yet a further object of the invention to provide a universal fire door operator that can control the speed of a dropping rolling door with a number of different braking mechanisms, including centrifugal governor, a viscous governor, an electromagnetic clutch braking and the like.

In order to achieve the above objects, as well as others that will become evident hereinafter. A fire door operator for a rolling door that can be raised when rolled onto a generally horizontal shaft when the shaft rotates in a first direction and lowered when the shaft rotates in an opposing direction includes a housing defining an axis. An outer main gear in the form of an annular ring is mounted within said housing for rotation about said axis and being formed with exterior gear teeth and radially inwardly spaced interior teeth. Planet gears are meshed with said interior teeth while a sun gear is meshed with said planet gears for rotation about said axis. A carrier is secured to said planetary gears and adapted to be coupled to a rolling door shaft. Locking means is provided for normally locking said main or ring gear in relation to said housing. A drive is provided for selectively rotating said sun gear and said carrier to transmit rotational power to a rolling door shaft when secured to said carrier. Releasing means is provided for selectively releasing said locking means to allow free rotation of said main gear and said carrier to allow a rolling door to be lowered under its own weight.

A method of operating a fire door operator for a rolling door that can be raised when rolled onto a generally horizontal shaft when the shaft rotates in a first direction and lowered when the shaft rotates in an opposing direction includes the steps of providing a housing defining an axis; providing an outer main gear in the form of an annular ring mounted within said housing for rotation about said axis and being formed with exterior gear teeth and radially inwardly spaced interior teeth; meshing planet gears with said interior teeth and meshing a sun gear with said planet gears for rotation about said axis; securing a carrier to said planetary gears and coupling said carrier to a rolling door shaft; normally locking said main gear in relation to said housing; selectively rotating said sun gear and said carrier with an external drive to transmit rotational power to a rolling door shaft when secured to said carrier; and selectively releasing said main gear to allow free rotation of said main gear and said carrier to allow a rolling door to be lowered under its own weight.

BRIEF DESCRIPTION OF THE DRAWINGS

The following descriptions are in reference to the accompanying drawings in which the same or similar parts are referenced by the same numerals throughout the several drawings, and wherein.

DETAILED DESCRIPTION

Figure 1:
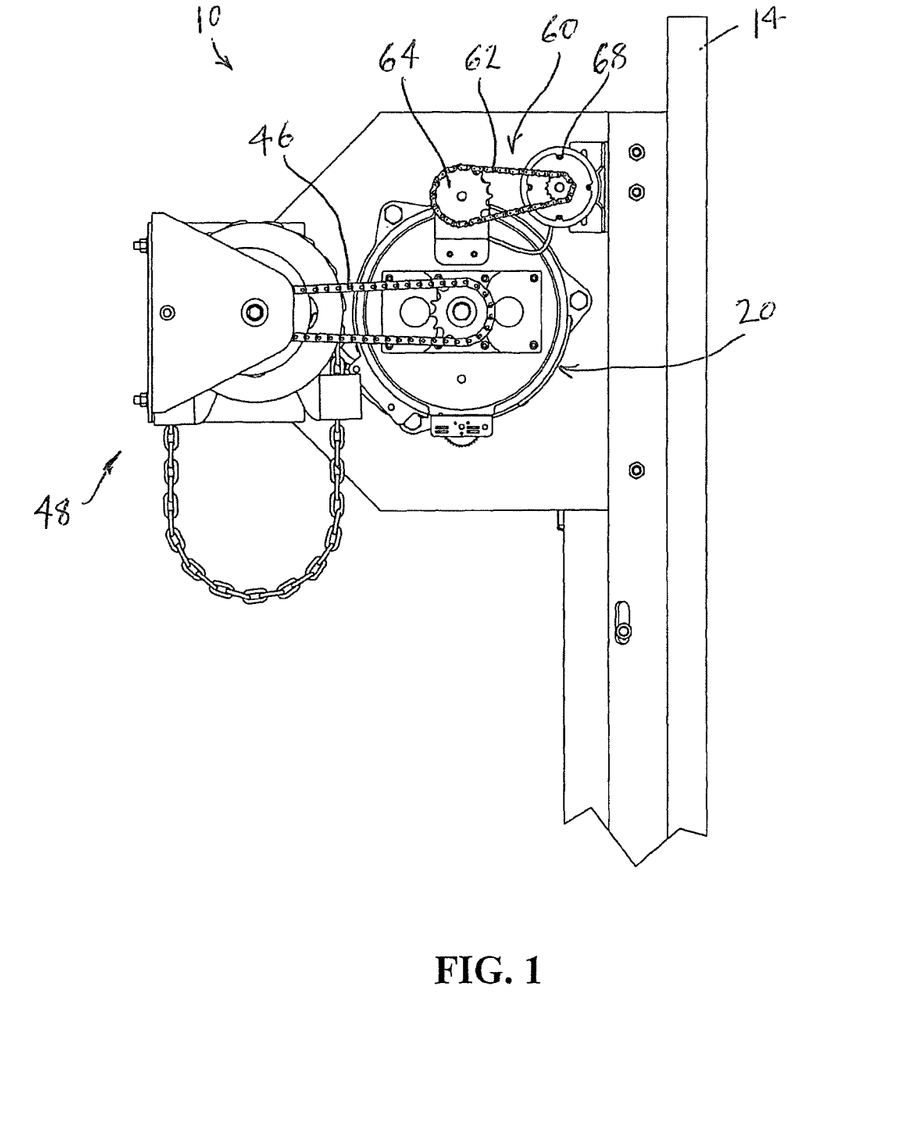
FIG. 1 is a side elevational view of one embodiment of the present invention illustrating a hand operated chain assembly to manually operate the operator to raise and lower a rolling door.

Referring now to the figures, in which identical or similar parts are designated by the same reference numerals throughout, and first referring to FIG. 1, an operator in accordance with the present invention is generally designated by the reference numeral 10.

Figure 2:
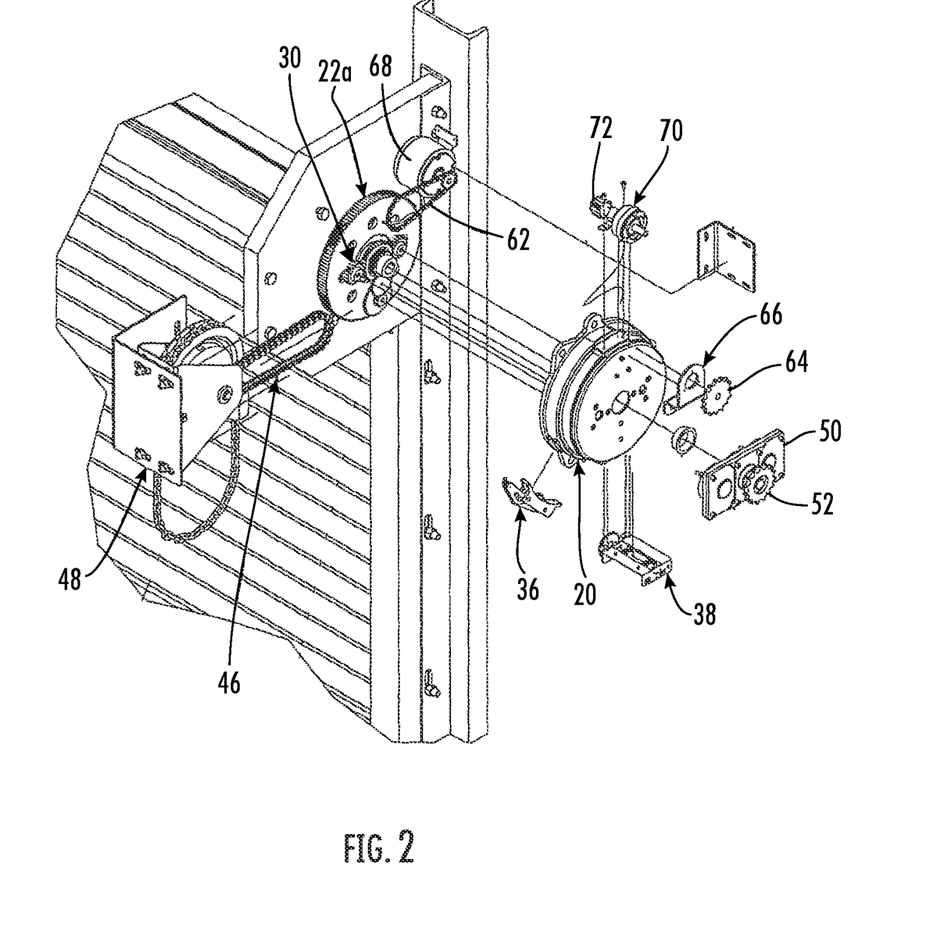
FIG. 2 is an exploded view of the operator shown in FIG. 1.
Figure 3:
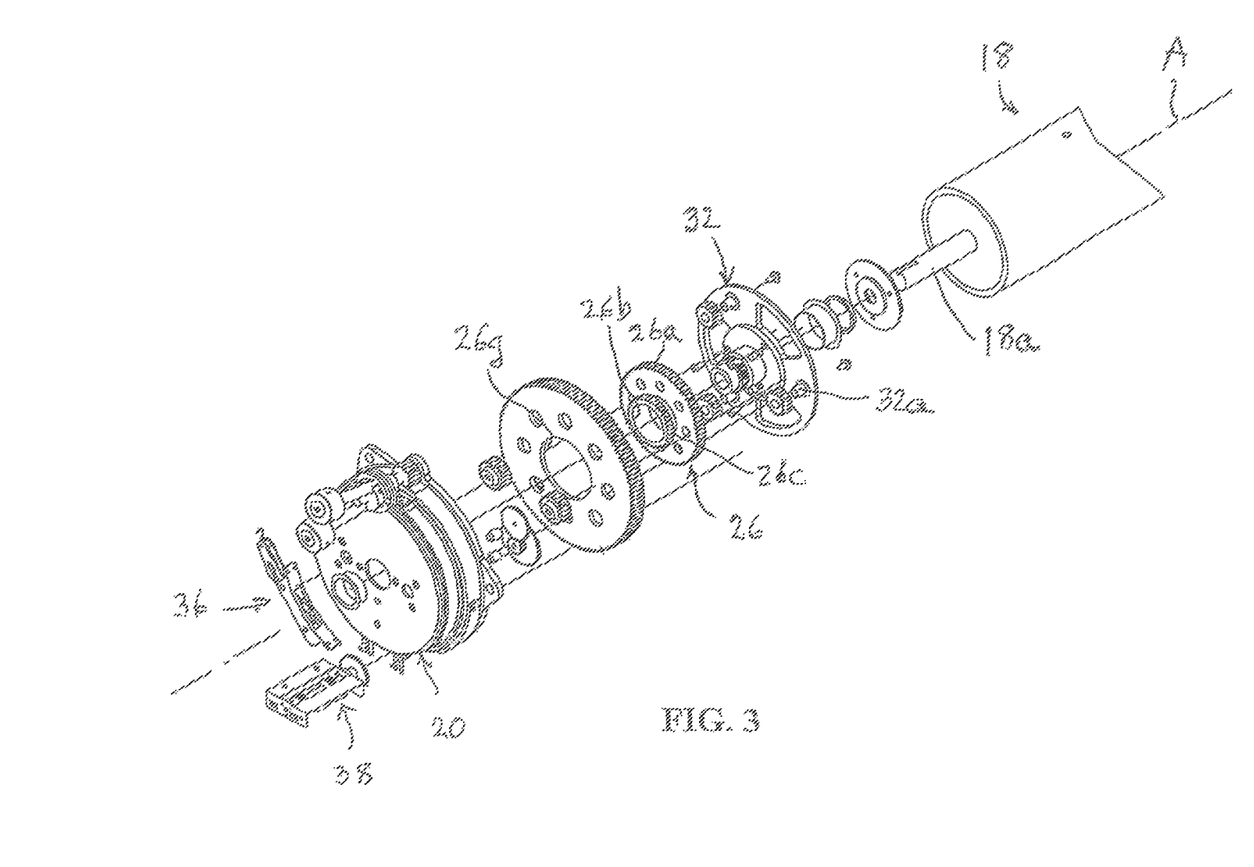
FIG. 3 is an exploded perspective view of the internal components of the operator shown in FIGS. 1 and 2 as viewed from the housing side.

The operator 10 is mounted on a side drive bracket plate 12 secured to a vertical channel or wall angles 14. A rolling door 16 shown in FIG. 2 is typically mounted on a barrel assembly 18 shown in FIG. 3 that defines an axis A and is operated by the controller 10. The fire door operator 10 is used to control a rolling door that can be raised when rolled onto the barrel assembly 18 when the shaft 18a rotates in a first direction and lowered when the shaft rotates in an opposing direction, as is known in the art. The shaft 18a can be any one of a number of different diameters depending on the size and the weight of the rolling door.

Figure 4:
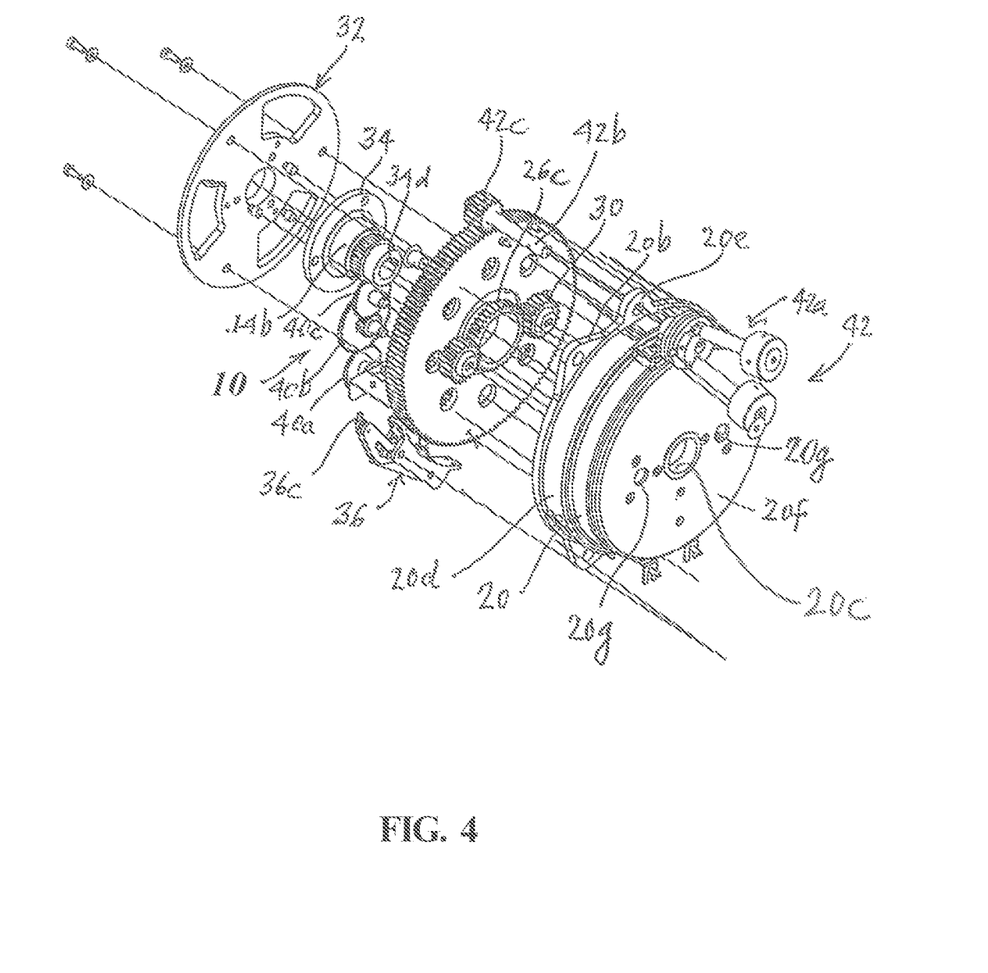
FIG. 4 is similar to FIG. 3 shown with the drive gears and the sun gear coupled to each other.
Figure 5:
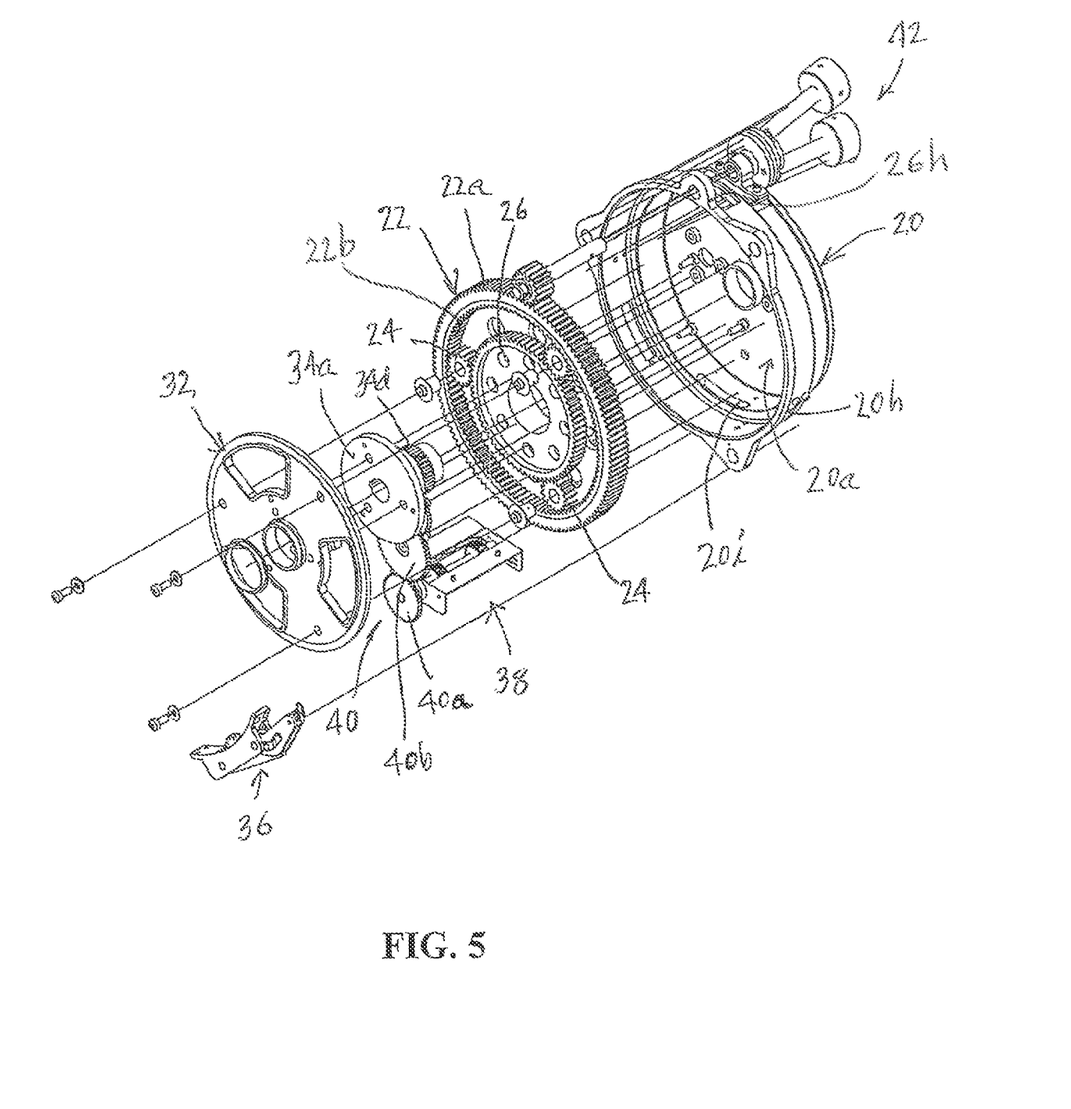
FIG. 5 is an exploded perspective view of the device as shown in FIG. 4, as viewed from the direction of the carrier and hub that receive and are connected to the shaft of the rolling door.

The operator 10 includes a generally cup-shaped housing 20 has interior space 20a as shown in FIG. 5, mounting flanges 20b and a central opening 20c as shown in FIG. 4. The housing forms a peripheral annular wall 20d, a flange 20e with an opening is formed along the periphery as shown, for example, in FIG. 4. While one axial end of the housing 20 is open the other end is substantially closed by a wall 20f formed with at least one lateral opening 20g from the axis A offset, two openings being shown in FIG. 4. The axis A is coextensive with the shaft 18a when assembled and mounted on the shaft.

Referring to FIGS. 4 and 5, the operator is provided with a main outer gear in the form of an annular ring mounted within the housing 20 for rotation about the axis A and is formed with exterior teeth 22a and radially inwardly spaced interior teeth 22b. Planet gears 24 are meshed with the interior teeth 22b and a sun gear 26 having outer teeth 26a and a central opening 26b is meshed with the planet gears 24 for rotation about the axis A.

A carrier 32 in the form of a circular plate or disk is fixedly attached to a hub 34 in any conventional manner and shares rotations with the carrier 32. The carrier 32 is also secured to the planetary gears 24, as indicated. The hub 34 can be secured to the shaft 18a in any suitable or conventional manner. The hub 34 includes a mounting plate 34a attachable to the carrier 32 and an annular extension 34b formed at the radial end opposite to the mounting plate with external teeth 34c. A keyway 34d is shown for securing the shaft 18a to the hub 34 for sharing rotations therewith.

A locking mechanism 36 is provided for normally locking the main outer or ring gear 22 in relation to the housing 20. The locking device, in the example shown, is a rocking arm 36 positioned in proximity to the exterior teeth 22a of the annular ring 22 and provided with locking teeth 36a configured to mesh with the outer or exterior teeth 22a of the main or ring gear 22. In a locking position, the teeth 36a engage the teeth 22a and prevent the ring gear 22 from rotating about the axis A. The rocker arm 36a can be manually or electromechanically urged from its normal biased locking position to move the locking teeth 36a out of engagement with the exterior teeth 22a thereby releasing the outer or gear ring 22. The rocker arm 36 can be controlled manually by a string or pull chain attached to a loop 36b shown in FIG. 4. However, the rocker arm 35 can also be moved from its normally biased position by any known actuating devices, such as salenoids, step motors or the like. When the main outer or ring gear 22 is released it can freely rotate within the housing 20 and is not exposed to contaminants or exterior objects that can potentially interfere with that movement.

One of the features of the invention is the use of a direct drive limit switch 38 shown, for example, in FIG. 5. As shown, the direct drive limit switch assembly 38 is connected by means of a reduction gear set 40 that includes gears 40a-40c, the gear 40c being directly coupled to the outer or exterior teeth 34c of the hub 34. Rotation of the hub 34 is directly indicative of the rotational speed of the barrel assembly or shaft 18a that, therefore, the speed at which the rolling door or curtain 16 is dropping. The direct drive limit switch 38 is also indicative of the position of the rolling door 16. When the door reaches its upper position or its lower position the drive limit switch 38 generates electrical signals that can be used to stop any motor drive from further attempting to raise a door any higher or dropping it any lower. The limit switch assembly is also discussed in U.S. Pat. No. 8,069,896. An important feature of the invention is provision of a slot or opening 20i (FIG. 5) in the housing 20 through which the gear 40a of the direct drive limit switch can extend so that at least a portion of this gear 40a projects below or outside of the housing 20. This allows the direct drive limit switch 38 to be mounted outside of the housing 20 while still maintaining precise information of the movements of the sun gear 26c and the position of the rolling door.

An opening 26h is provided in the wall 20d for providing access to the outer teeth 22a of the ring gear 22 when the rocker arm 36 is mounted on the housing 20. Similarly, an opening 20i is provided on the annular wall 20d to enable the gear train 40 to engage the direct drive limit switch assembly 38 which is likewise mounted exteriorly of the housing 20.

When the rocker arm 36 is moved by means of a chain, cable or the like (not shown) connected to hook 36c from a locking position in which the teeth 36a engage the teeth 22a on the ring gear to an unlocking position these teeth disengage from each other. The ring gear is freed to rotate as is the sun gear 26 as well as the hub 34 and the carrier 32. This allows the shaft 18a to freely rotate and the door rolled up on the barrel assembly to drop under its own weight. However, when the door starts to accelerate and pick up speed the dropping speed must be regulated or controlled to avoid excessive speeds and potential hazards. Other known release devices can be used such as fusible links, electromechanical release devices such as solenoids and motor controlled release devices.

In FIGS. 1 and 2 such control over the rotational speed of the hub 34 and the carrier 32 is provided by features shown in FIGS. 1 and 2 and FIGS. 3-5. Such speed control is provided by a governor 42 that includes a centrifugal mechanism 42a, a shaft 42b and a gear 42c that is always engaged with the outer teeth 22a of the ring gear 22. The shaft 42b extends through an opening in the flange 20e formed on the housing 20. Other braking mechanisms can be used, such as an electromagnetic clutch 60 coupled by means of a chain 62 to a sprocket 64 mounted on a bracket 66. The sprocket 64 is coupled by means of a bearing 70 to a gear 72 that is always engaged with the outer teeth 22a of the ring gear. When the ring gear starts to accelerate excessively upon release by the rocker arm 36 the electromagnetic clutch 60 detects the speed and creates counter force that resists further increases in the speed of the ring gear. Braking devices, including viscous governors and other braking devices well known to those in the art can be used with different degrees of advantage.

Drives for raising and lowering the door are applied via the sun gear 26, as indicated, through the outer teeth 26c that mesh with the drive gears 30. Other known ways for applying rotational forces to the sun gear cam be used and contemplated.

Figure 8:
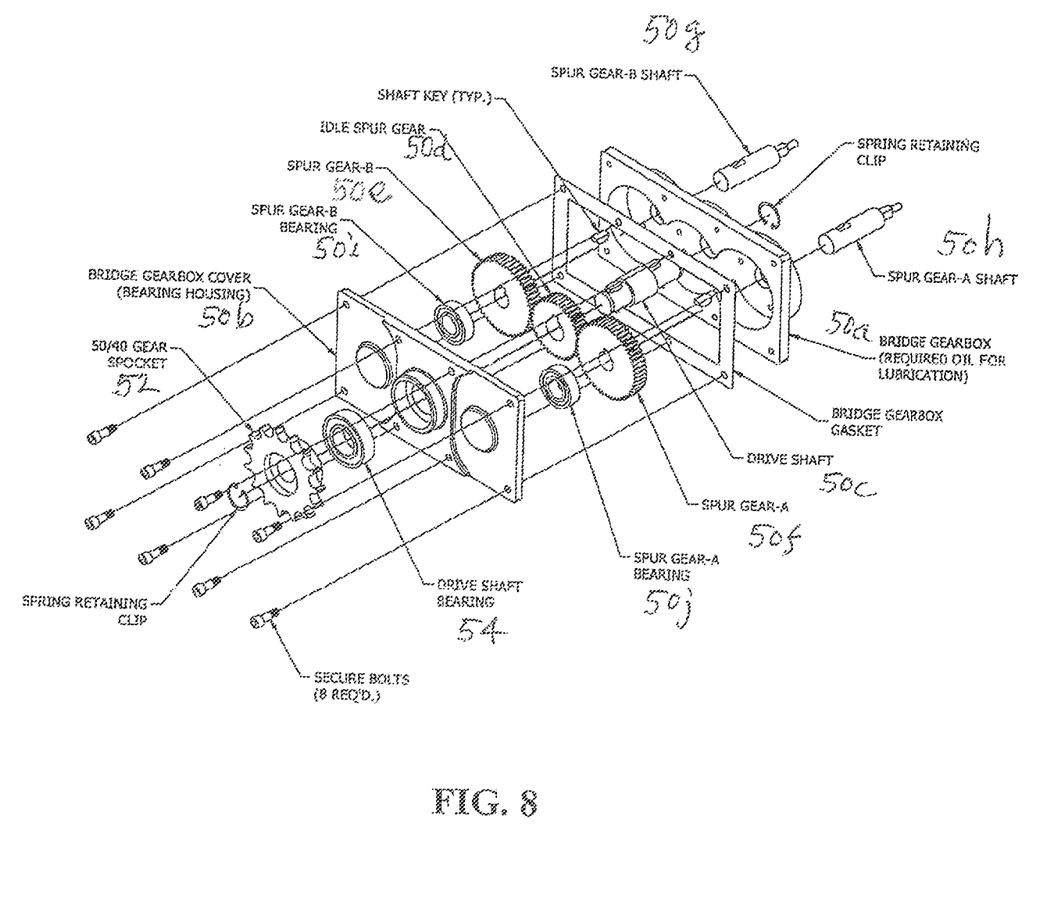
FIG. 8 is an exploded view of a bridge gear box used in conjunction with the operator shown in FIG. 1.

In FIGS. 1 and 2 drive is provided by a hand chain assembly 28, the details of which are more fully described in U.S. Pending patent application Ser. No. 16/584,330 which is incorporated as if fully set forth herein. For this purpose, two openings 26g are provided in the housing 20 as shown in FIG. 4. The chain 46, driven by the hand chain assembly 48, is coupled to sprocket gear 52 to a bridge gear box 50, more fully described in connection with FIG. 8. Bridge gear box 50 includes a housing 50a having a cover 50b. A drive shaft 50c is coupled to an idle spur gear 50d meshed with two spur gears 50e and 50f as shown. The spur gears 50e and 50f are coupled to spur gear shafts 50g and 50h, respectively, mounted on bearings 50i and 50j. The drive shaft 50c and gear sprocket 52 are also mounted on a drive shaft bearing 54. As will be clear, rotation of the gear sprocket 52 and the drive shaft 50c transmits rotational torque by means of the spur gear 50d to the spur gears 50e and 50f thereby rotating spur gear shafts 50g and 50h. These are coupled, in turn, to drive gears 30 that are coupled to and transmit rotational forces to the sun gear by way of the outer teeth 26c.

Figure 6:
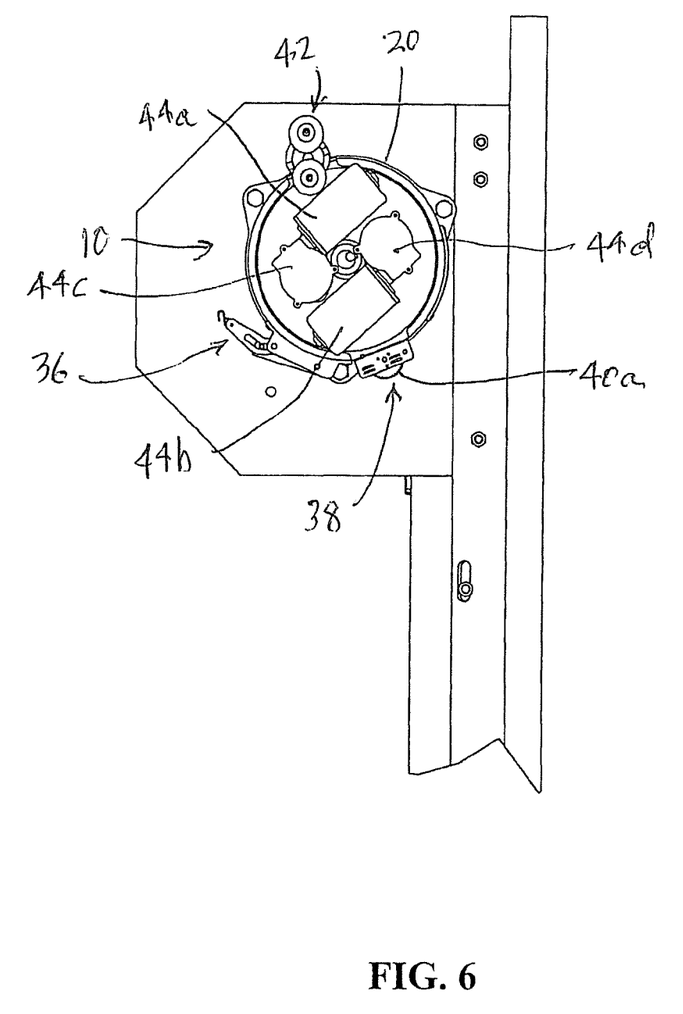
FIG. 6 is a side elevational view of an alternate embodiment of the operator utilizing twin DC motors to drive the operator.
Figure 7:
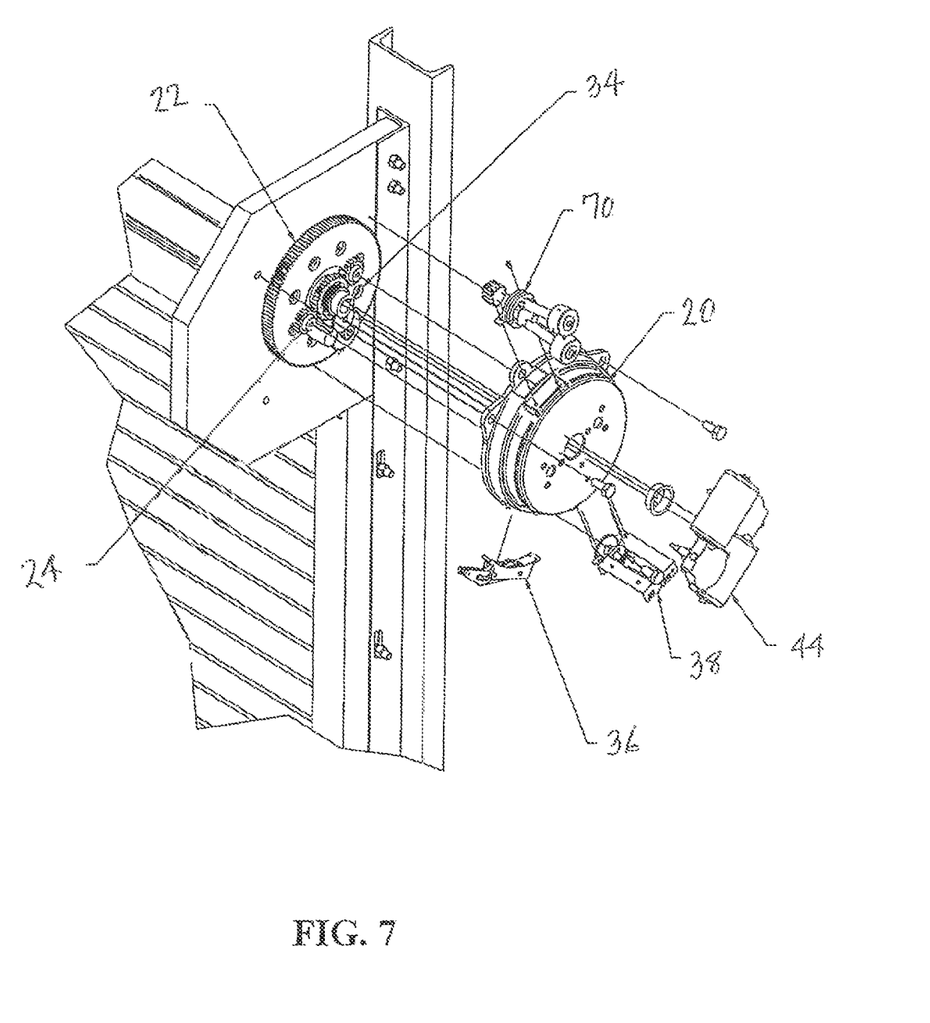
FIG. 7 is an exploded view of the operator shown in FIG. 6.

Instead of hand chain assembly 48 any other suitable drive 44 can be used. For example, referring to FIGS. 6 and 7, twin DC motors 44a, 44b each coupled to a right angle degree gear box 44c, 44d, respectively, each of the gear boxes has a shaft that extends through the openings 26g of the housing and coupled to the drive gears 30 as with the gear shafts 50g, 50h. Other devices can be used such as direct drive chain hoists, reduced drive chain hoists and compound reduction chain hoists.

Figure 9:
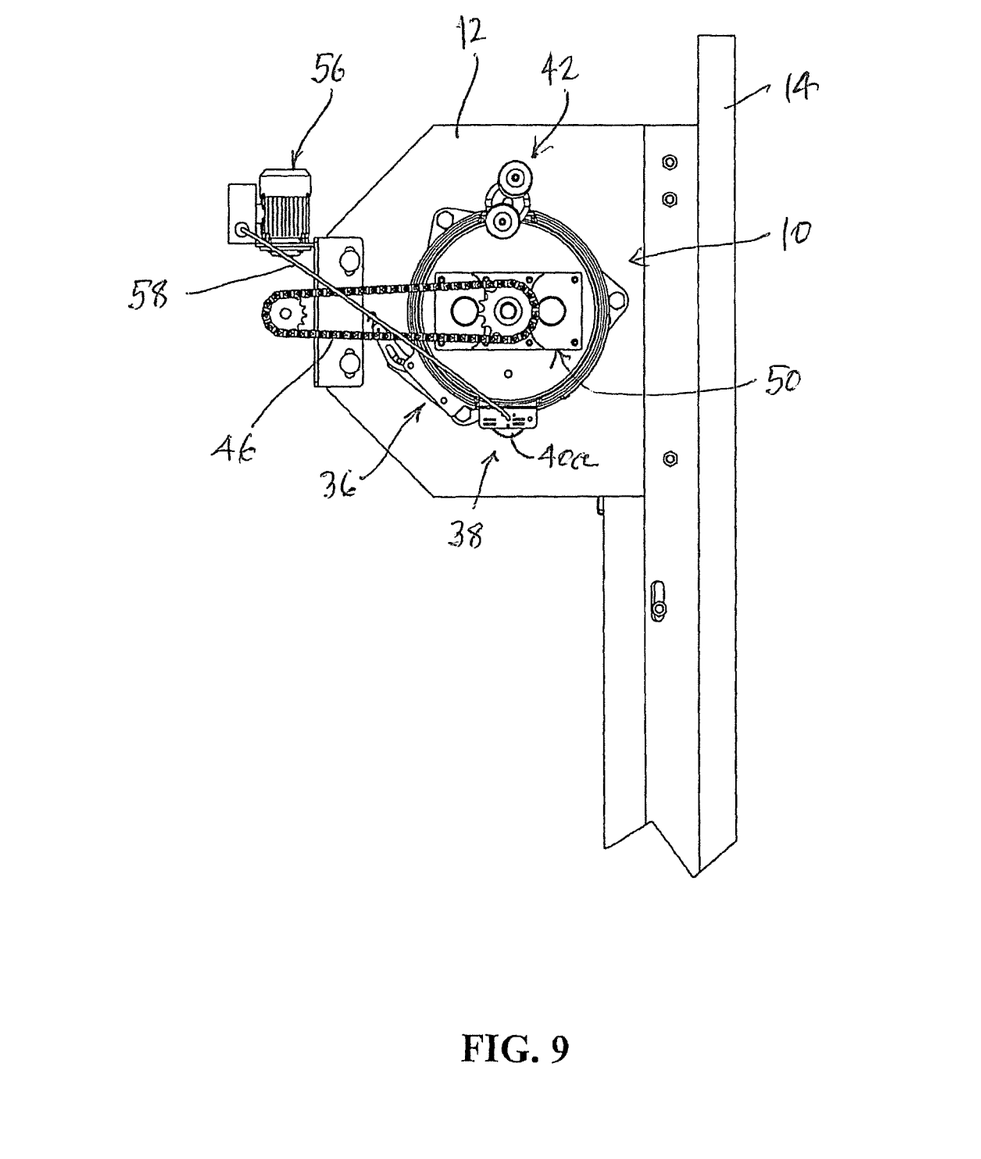
FIG. 9 is a side elevational view of a still further embodiment of the invention driven by an external motor.
Figure 10:
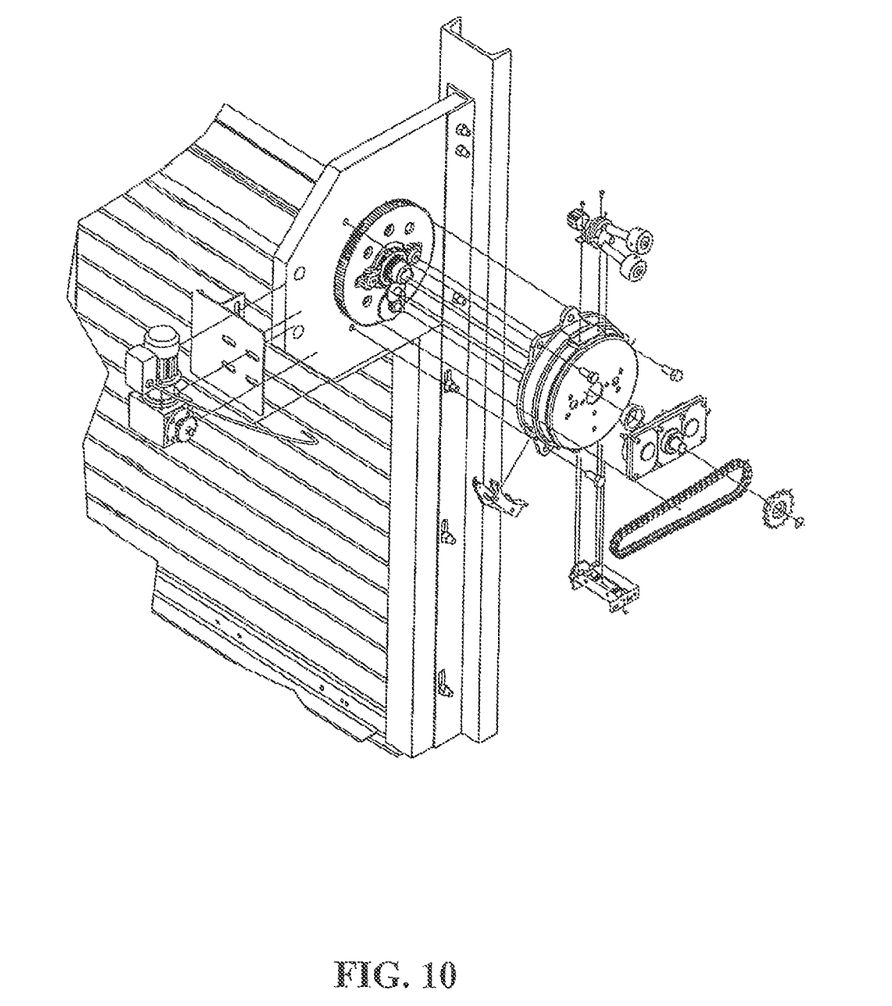
FIG. 10 is an exploded view of the operator shown in FIG. 9.
Figure 11:
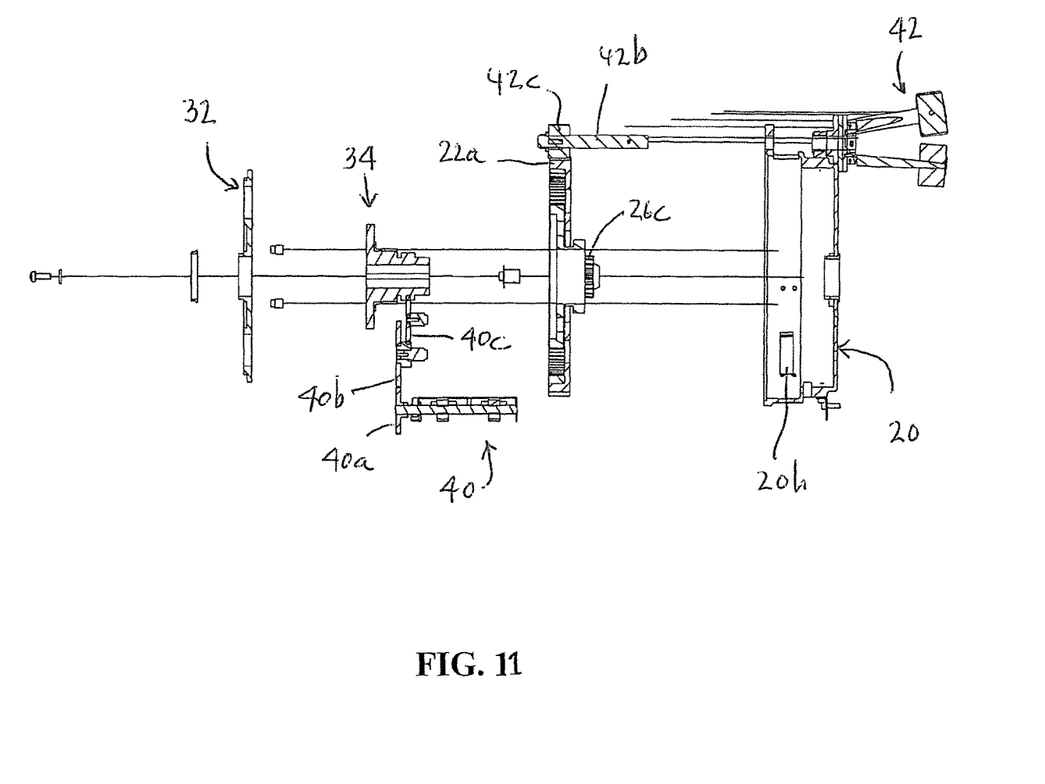
FIG. 11 is an exploded view, in elevation of the operator shown in FIG. 4.

In a similar manner, referring to FIGS. 9 and 10, an external motor 56 can be used to drive the chain 46. The motor 56 is electrically coupled to the limit switch assembly 38 by means of conductor 58 to prevent continued rotation of the motor 56 when the limit switches indicate that the door has reached a lower most or an upper most position and, the bridge gear box 50 can be used to transmit the drive power of the motor 56 to the drive gears 30 and, therefore, to the sun gear 26. The motor 56 can be of a third party operator 74, so that the operator of the present invention can be used with third party operators in the aforementioned drive mechanism.

It will be appreciated that the use of a ring gear 22 provided with exterior or outer teeth 22a and inner teeth 22b in the planetary gear system 10 render the operator extremely versatile and, in effect, universal in that it can be adapted to work with almost any drives and braking systems. Additionally, by utilizing a direct drive gear set 40 coupled to the hub 34, therefore, also to the shaft attached to the hub the direct drive limit switch assembly can be mounted outside of the housing. This facilitates servicing it and adjustments of the direct drive limit assembly without requiring disassembly of the entire unit.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A fire door operator for a rolling door that can be raised when rolled onto a generally horizontal rotational rolling door shaft when the rotational rolling door shaft rotates in a first direction and lowered when the rotational rolling door shaft rotates in an opposing second direction, said operator comprising a stationary housing defining an axis; an outer main gear, wherein the outer main gear is an annular ring mounted within said housing for rotation about said axis and formed with exterior gear teeth and radially inwardly spaced interior gear teeth; speed control means coupled to said exterior gear teeth for controlling a rotational speed of said outer main gear; planetary gears meshed with said interior gear teeth; a sun gear comprising a first set of teeth that mesh with said planetary gears for rotation about said axis and a second set of teeth; a carrier secured to said planetary gears and coupled to said rotational rolling door shaft; locking means configured to lock said outer main gear in relation to said housing, preventing rotation of said outer main gear in the first direction and the second direction; a drive means coupled to said second set of teeth for selectively rotating said sun gear and said carrier to transmit rotational power to said rotational rolling door shaft; and releasing means for selectively releasing said locking means to allow free rotation of said outer main gear in relation to said housing to allow said rolling door to be lowered under its own weight, said outer main gear being driven directly by said planetary gears only when said locking means is released by said releasing means.

2. The fire door operator as defined in claim 1, wherein said locking means comprises a rocker arm positioned in proximity to said exterior teeth of said outer main gear and provided with locking teeth configured to mesh with said exterior teeth and being biased to engage said exterior teeth to normally lock said outer main gear against rotation about said axis.

3. The fire door operator as defined in claim 2, wherein said rocker arm is provided with means responsive to an external force to move said rocker arm to disengage said locking teeth from said exterior teeth.

4. The fire door operator as defined in claim 1, wherein said carrier comprises an interchangeable hub to accommodate a predetermined shaft diameter.

5. The fire door operator as defined in claim 1, wherein said drive means comprises a hand-operated chain drive coupled to said sun gear.

6. The fire door operator as defined in claim 1, wherein said drive means comprises an exterior motor coupled to said sun gear.

7. The fire door operator as defined in claim 6, wherein said exterior motor is coupled by means of a drive shaft engaged with said sun gear; and a sprocket fixedly mounted on said drive shaft.

8. The fire door operator as defined in claim 1, further comprising a bridge gear box coupling a drive shaft to two spur gears for driving said sun gear.

9. The fire door operator as defined in claim 1, wherein said drive means comprises twin motors coupled to said sun gear.

10. The fire door operator as defined in claim 1, wherein said speed control means comprises a governor mechanism coupled to said exterior teeth of said outer main gear to be responsive to said rotational speed of said outer main gear and generating a retarding force to prevent said outer main gear from exceeding a predetermined rotational velocity.

11. The fire door operator as defined in claim 1, further comprising limit switches coupled directly to said carrier.

12. The fire door operator as defined in claim 1, wherein limit switches are coupled to said carrier by a gearset.

13. The fire door operator as defined in claim 12, wherein said gearset includes at least one gear extending through said housing and said limit switches engage said at least one gear.

14. The fire door operator as defined in claim 13, wherein said limit switches are mounted on an exterior of said housing to facilitate adjustments of said limit switches without disassembling the fire door operator.

* * * * *